US009210422B1

(12) United States Patent
Choudhary

(10) Patent No.: US 9,210,422 B1
(45) Date of Patent: *Dec. 8, 2015

(54) METHOD AND SYSTEM FOR STAGGERED PARALLELIZED VIDEO DECODING

(71) Applicant: Imagination Technologies Limited, Hertfordshire (GB)

(72) Inventor: Saif Choudhary, Santa Clara, CA (US)

(73) Assignee: Imagination Technologies Limited (GB)

( * ) Notice: Subject to any disclaimer, the term of this patent is extended or adjusted under 35 U.S.C. 154(b) by 0 days.

This patent is subject to a terminal disclaimer.

(21) Appl. No.: 13/935,357

(22) Filed: Jul. 3, 2013

Related U.S. Application Data

(63) Continuation of application No. 12/699,799, filed on Feb. 3, 2010, now Pat. No. 8,498,334.

(51) Int. Cl.
*H04N 19/44* (2014.01)
*H04N 19/436* (2014.01)

(52) U.S. Cl.
CPC ......... *H04N 19/00521* (2013.01); *H04N 19/44* (2014.11); *H04N 19/436* (2014.11)

(58) Field of Classification Search
CPC ....... A61B 17/7052; G10K 9/13; G10K 9/22; G06F 12/0207; G06F 12/04; G06F 13/16; G06F 13/28; G06F 12/0607; G06F 9/3867; G06F 9/4436; G06F 13/1673; H04N 19/436; H04N 19/44; H04N 19/13; H04N 19/60; H04N 19/70; H04N 21/41407; H04N 21/4223

USPC .......... 348/699, 441, 446, 607; 382/238, 236, 382/232; 375/240.01–240.29

See application file for complete search history.

(56) References Cited

U.S. PATENT DOCUMENTS

| 5,170,445 | A | 12/1992 | Nelson et al. | |
|---|---|---|---|---|
| 6,646,578 | B1 | 11/2003 | Au | |
| 7,020,200 | B2 | 3/2006 | Winger | |
| 7,251,279 | B2 | 7/2007 | Song | |
| 2009/0034625 | A1* | 2/2009 | Komi et al. | 375/240.25 |
| 2011/0032996 | A1* | 2/2011 | Zhang | 375/240.25 |

OTHER PUBLICATIONS

ITU-T H.264, Telecommunication Standardization Sector of ITU, pp. 207-211; 219-223, International Telecommunication Union, May 2003.

* cited by examiner

*Primary Examiner* — Behrooz Senfi
(74) *Attorney, Agent, or Firm* — Marger Johnson

(57) ABSTRACT

A method and system for staggered parallelized video decoding system decodes a compressed video stream at approximately double the performance of conventional systems, and outputs the decoded stream to a video display device. Even and odd video frames from the video stream are identified and stored in a memory. A first decoder processes a first portion of a first even frame from among the stored even frames. After the first decoder completes processing the first portion of the first even frame, a second decoder begins processing a first odd frame from among the stored odd frames. The processing start times of the odd frames are staggered with respect to the even frames and vice versa, and the even and odd frames are simultaneously processed using first and second decoders.

8 Claims, 8 Drawing Sheets

METHOD AND SYSTEM FOR STAGGERED PARALLELIZED VIDEO DECODING

RELATED APPLICATION

This application claims priority and is a continuation application of co-pending U.S. patent application Ser. No. 12/699,799 entitled "METHOD AND SYSTEM FOR STAGGERED PARALLELIZED VIDEO DECODING," filed Feb. 3, 2010, which is incorporated by reference.

TECHNICAL FIELD

This disclosure relates to video decoding, and, more particularly, to a method and system for staggering and parallelizing the decoding of video frames.

BACKGROUND

As the quality and resolution of a video stream increases, the demands placed on the video decoder to produce a high-quality output from the compressed video stream also increases. A compressed video stream includes a series of video images, generally referred to as video frames. Patterns corresponding to objects and background tend to "move" within the video frames to form corresponding objects or background from one video frame to the next. An object in the current frame may generally correspond to the same object in a reference frame, but may be in a different location.

In video codecs, each video frame is commonly divided into blocks or macroblocks. The size of a macroblock is typically 16×16 pixels, but can be any size, for example, down to 4×4 pixels, according to various standards. Such standards can include, for example, moving picture expert group (MPEG) MPEG-1, MPEG-2, and MPEG-4H.264/MPEG-4 advanced video coding (AVC) (hereinafter referred to as H.264, the standard of which is expressly incorporated by reference herein).

In the encoding process, macroblocks (or smaller blocks within each macroblock) in the current frame are compared to regions in previous frames to locate the best matching macroblock. In other words, video encoders use motion estimation to search one or more previous reference frames to find the area that best matches the currently being encoded macroblock of the current frame. Video decoders carry out the same process in reverse order. Motion estimation is just one of many techniques used in optimizing the encoding and decoding of video frames.

A video decoder is designed with a target number of clocks per macroblock. Each stage in a decoder pipeline is designed to process each macroblock within this target number of clocks. Conventionally, the decoder outputs one decoded macroblock every target number of clocks. This is referred to as the throughput of the decoder.

The target number of clocks per macroblock and the operating frequency of the decoder together determine the maximum performance that the decoder can achieve, or otherwise deliver. The operating frequency divided by the target number of clocks yields the number of macroblocks the decoder can process in one second. For example, a 1080 p video stream, i.e., having 1080 progressive horizontal scan lines and 1920 pixels per horizontal scan line, requires around 486,000 macroblocks to be processed per second at a frame rate of 60 Hz, a significant number of macroblocks to process for a decoder.

To achieve higher performance from a decoder, two approaches are conventionally attempted. First, the operating frequency of the decoder can be increased. The number of macroblocks a decoder can process per second is directly proportional to the operating frequency. Increasing the operating frequency allows the decoder to process more macroblocks per second, and hence, a higher frame resolution and frame rate can be supported.

The operating frequency, however, cannot be increased arbitrarily. At a specific process node, a decoder design can only be over-clocked to an extent that the design allows without breaking timing rules or specifications. As the operating frequency is increased, the clock period reduces, which makes meeting the timing specifications increasingly difficult. If the operating frequency is increased and the clock period becomes less than the length of the critical path in the design, timing rules or specifications will be violated and the decoder design will fail. This problem can be slightly mitigated by moving the decoder design to a smaller transistor geometry. But such approach is limited by the state of the current fabrication technology, which advances according to the well-known Moore's law.

Another conventional approach for achieving higher performance from a video decoder is to decrease the target number of clocks per macroblock. The performance of a video decoder is inversely proportional to the target number of clocks per macroblock. Reducing this number causes more macroblocks to be processed per second, and hence, a higher resolution and frame rate can be supported. Many hurdles present themselves with this approach. For example, a video decoder design is specifically architected for some specific target number of clocks per macroblock. Changing the number of clocks per macroblock at least requires a major overhaul of the architecture and design of the video decoder, if not a total re-design.

Depending on the state of the video and broadcasting industry, the turnaround time for such activities may well be large enough to make the new design of the video decoder obsolete, and trigger yet another overhaul for even higher resolutions and higher frame rates. This approach may cause a video decoder design house to constantly play catch-up with the industry without being able to make a high-performance decoder sufficient to meet market demands.

Embodiments of the invention address these and other limitations in the prior art.

DETAILED DESCRIPTION

Figure 1:
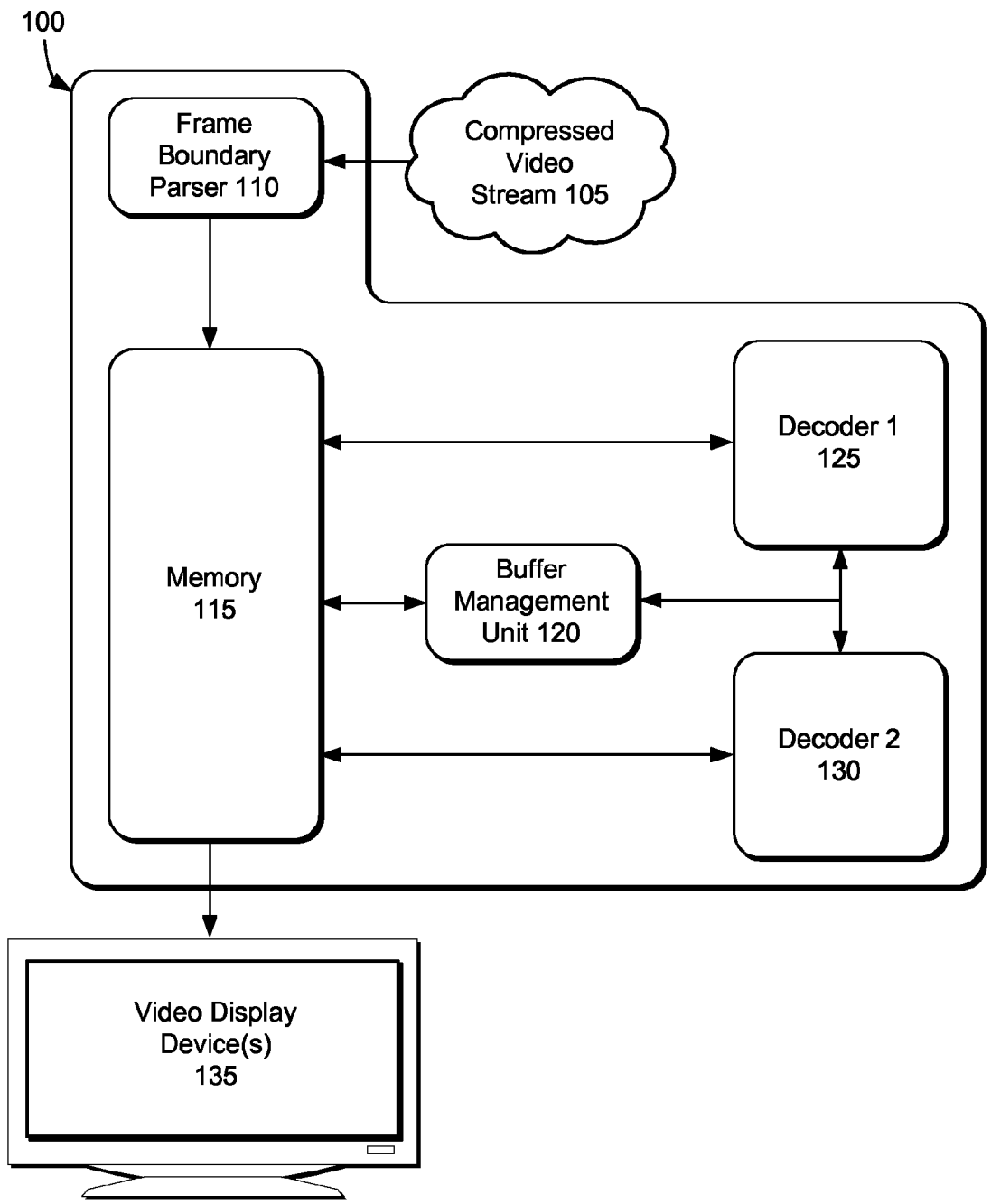
FIG. 1 is a block diagram showing a staggered parallelized video decoding system receiving a compressed video stream according to an embodiment of the invention.

FIG. 1 is a block diagram showing a staggered parallelized video decoding system 100 receiving a compressed video stream 105 according to an embodiment of the invention. The compressed video stream 105 includes a series of compressed video images, generally referred to as video frames. While the terms "video frame," "video frames," or "frame" are used herein, these terms should not be construed in an overly narrow sense, and can include, for example, video fields, pictures, or other video images. Moreover, the terms "decode" and "decompress" are used interchangeably herein, and refer to the processing, i.e., specifically decoding, of "encoded" or "compressed" video streams. While the term "processing" used herein generally refers to decoding, such term can include, although need not include, other processing besides decoding.

The staggered parallelized video decoding system 100, or any components included therein, can include hardware, such as one or more application specific integrated circuits (ASICs), field-programmable gate arrays (FPGAs), digital signal processors (DSPs) or microprocessors, and/or software such as specially generated programs or codes structured to operate in conjunction with the hardware listed above, and/or may include firmware, or any combination thereof. The system 100 can also be implemented as a single board or a single chip. In some embodiments, components such as video decoders 125 and 130 can be two distinct integrated circuit chips and arranged on a single printed board; alternatively, the decoders 125 and 130 can be implemented as a single combined integrated circuit chip.

In FIG. 1, the staggered parallelized video decoding system 100 decompresses the compressed video stream 105 and provides the decompressed video information to a video display device or devices 135 for presentation to a viewer. The video display device(s) 135 represents any suitable device, system, or structure for presenting video information to one or more viewers. The video display device(s) 135 could, for example, represent a television, computer monitor, or projector, among other possibilities. The staggered parallelized video decoding system 100 could provide the decompressed video information to any other destination, such as a network device, computer system, a projector, a television such an HDTV television, a set-top box, a high-end camera, an optical reading and display device such as a digital versatile disc (DVD) device, or other suitable device (not shown).

The compressed video stream 105 can be received from any suitable video source (not shown). For example, the video stream 105 can be received from any device, system, or structure capable of generating or otherwise providing compressed video information. The video source could, for example, represent a network device, computer system, non-volatile or volatile memory, television receiver, video camera, video encoder, a storage device, DVD device, or any other suitable source of video information.

The frame boundary parser 110 of the staggered parallelized video decoding system 100 receives the compressed video stream 105 and identifies "even" video frames and "odd" video frames from the video stream. The frame boundary parser 110 can parse the start codes of the video frames to identify the various even and odd frames. The compressed even and odd video frames are stored in the hardware memory 115, for example, by the frame boundary parser 110. The memory 115 can be formed of, for example, dynamic random access memory (DRAM), synchronous dynamic RAM (SDRAM), double data rate RAM (DDR SDRAM), non-volatile memory, among other suitable memories or storage technologies.

A first or "even" decoder 125 is operatively coupled to the memory 115, and reads and processes a portion of a first compressed even frame from among the stored even frames. After the decoder 125 completes processing the portion of the first even frame, a second or "odd" decoder 130, which is operatively coupled to the memory 115, can begin reading and processing a first compressed odd frame from among the stored odd frames. As a result, the start times for the decoders 125 and 130 are staggered, and each of the decoders 125 and 130 simultaneously decode different portions of the compressed video stream 105. The decoders 125 and 130 may rely on previously decoded portions. Preferably, the decoders 125 and 130, and any decoder discussed herein, are compliant with H.264 standards.

As will be discussed in detail below, the first and second decoders work cooperatively to decompress the compressed video stream 105 in a particular staggered and parallelized fashion, so that the video frames can be efficiently decompressed and displayed on video display device(s) 135.

To facilitate the cooperation between the first decoder 125 and the second decoder 130, a buffer management unit 120 stores information about decoded video frames including, for example, a list of decoded video frames, particular attributes of the decoded video frames, or the decoded video frames themselves. The buffer manage unit 120 can include a decoded picture buffer (DPB) management unit. Either or both of the decoders 125 and 130 can simultaneously or individually read information from the buffer management unit 120 or write information to the buffer management unit 120. In this manner, information pertinent to the decoding of the compressed video stream 105 can be shared between the video decoders 125 and 130. Additional logic (not shown), in addition to the buffer management unit 120, can be shared between the video decoders 125 and 130.

Figure 2:
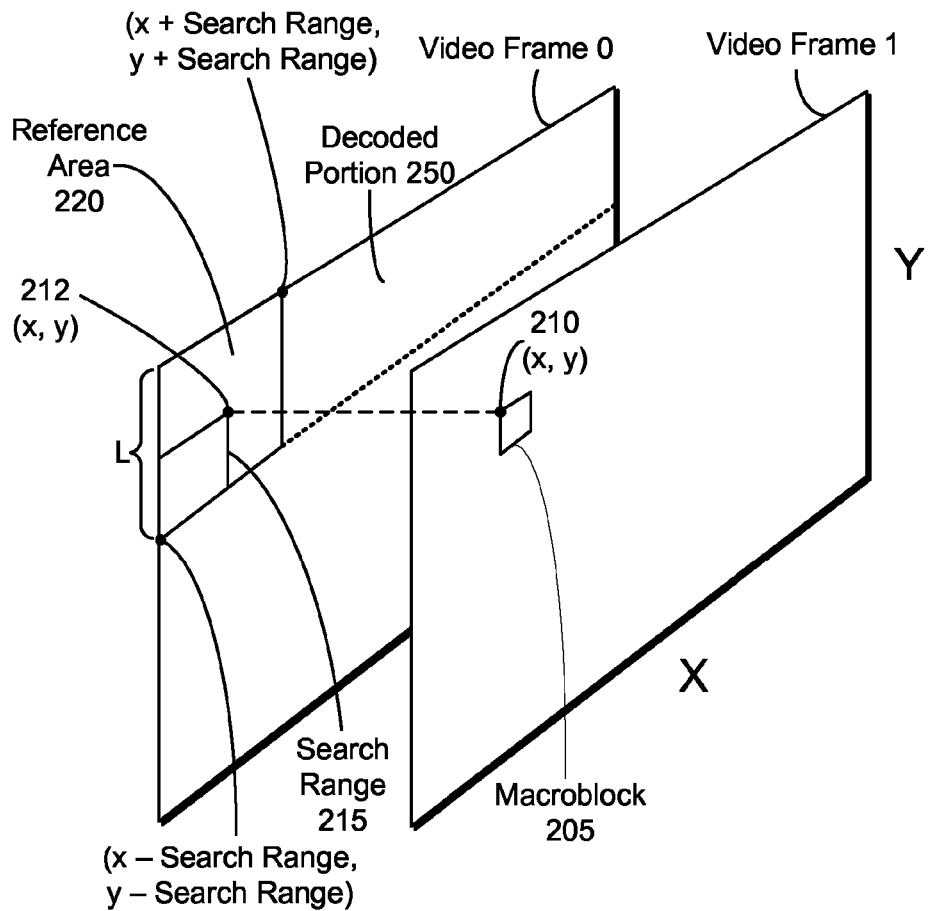
FIGS. 2 and 2A illustrate even and odd video frames, created within the system of FIG. 1, showing a relationship between various points, a search range, and a reference area.

FIG. 2 illustrates even video frame 0 and odd video frame 1. While only video frames 0 and 1 are shown in FIG. 2, it should be understood that the inventive principles discussed with reference to these two video frames can be applied to any number of video frames.

Generally, information from one or more previous video frames, such as video frame 0, is used to decode a current video frame, such as video frame 1. For example, under the H.264 standard, any given macroblock being decoded in a current video frame depends on information from a previously decoded macroblock in a previous video frame or frames within the video stream to achieve motion compensation. Although information from a previous video frame is relied upon to achieve motion compensation for a given macroblock, such information is restricted to a certain reference area within the previous video frame or frames. In some embodiments of the present invention, two or more frames are decoded simultaneously, and the reference area is determined by a search range used during motion estimation when the video frames are initially encoded, prior to the video frames being decoded.

For example, consider the example macroblock 205 shown in FIG. 2. The macroblock 205 can have a start location of (x, y) at point 210 of the video frame 1 currently being decoded. While the start location of (x, y) at point 210 is illustrated as the upper-left corner of the macroblock 205, this need not be the case; for example, the start location can be another different corner of the macroblock 205 or any predefined point associated with the macroblock 205. The decoding of macroblock 205 can use information, such as previously decoded pixels or fractions of pixels in a previously decoded portion of frame 0, that are located in a reference area 220 bounded by the rectangle starting at location (x− search range, y− search range) and ending at location (x+ search range, y+ search range), where x corresponds to an x-coordinate of point 212 and y corresponds to a y-coordinate of point 212. Point 212 of previous video frame 0 corresponds to a similarly located point 210 of current video frame 1. Although reference is made to the "previous" video frame 0 and the "current" video frame 1, portions of both video frames are simultaneously being decoded. The search range referred to herein corresponds to the search range 215 used by the encoder (not shown) to encode the video frames 0 and 1, or other video frames associated with the video stream 105.

A decoded portion 250 corresponds to a portion of the video frame 0 that has been decoded by decoder 125. As illustrated in FIG. 2, L number of lines, which includes the reference area 220, have been decoded by decoder 125. As a result, the decoder 130 can begin decoding macroblock 205 after the L number of lines of video frame 0 have been decoded by the different decoder 125. L corresponds to a height of the reference area 220.

Staggered parallelized video decoding systems can be implemented so that macroblock 205 of video frame 1 can be decoded after the portion 250 of video frame 0, including the reference area 220, has been decoded, but before the entire frame 0 has been decoded. In this manner, start times of two different decoders (e.g., decoders 125 and 130 of FIG. 1) are staggered, where one decoder 125 processes at least some portions of frame 0 and another decoder 130 simultaneously processes at least some portions of frame 1. Although the reference area 220 has a predefined size, the location of the reference area 220 can continually change depending on which macroblock of frame 1 is currently being decoded.

The (x, y) point 210 corresponds to a location of a macroblock currently being decoded in the video frame 1. The reference area 220 is determined based on the point (x, y) 210, and the search range limits. For lower quality video, the search range may correspond to, for example, about 64, 128, or 256 lines of pixels. For higher quality video, such as 1080 P 60 Hz, the search range may correspond to, for example, about 512 lines of pixels. Generally, the staggered parallelized video decoding system is intended for higher quality video decoding where the performance demands are greatest. Nevertheless, the inventive principles described herein can also be used for lower quality video.

The search range is generally less than or equal to about one half a height of a video frame, particularly for higher quality video. For example, a high resolution video frame may have a width of 4096 pixels and a height of 2048 pixels. The 512 line search range, as defined by H.264 standard, is less than the height of the high resolution video frame.

As a result, the odd video frame 1 can start to be decoded after about one half of the even video frame 0 has been decoded, or alternatively, after L number of lines of the decoded portion 250 have been decoded. This causes a latency of at least L number of search lines. Other latency periods are possible depending on implementation considerations. Once the decoding of the odd video frames, such as video frame 1, has started, the decoding of the even and odd video, such as video frames 0 and 1, etc., can run at "full throttle," or in other words, as fast as the decoders can process video frames, for the remainder of the video stream 105. In this manner, the decoding of any frame is ahead in time of the decoding of the next frame by another decoder by at least L number of lines, thus ensuring that the motion compensation process has the information needed from the respective previous frames.

Figure 2A:
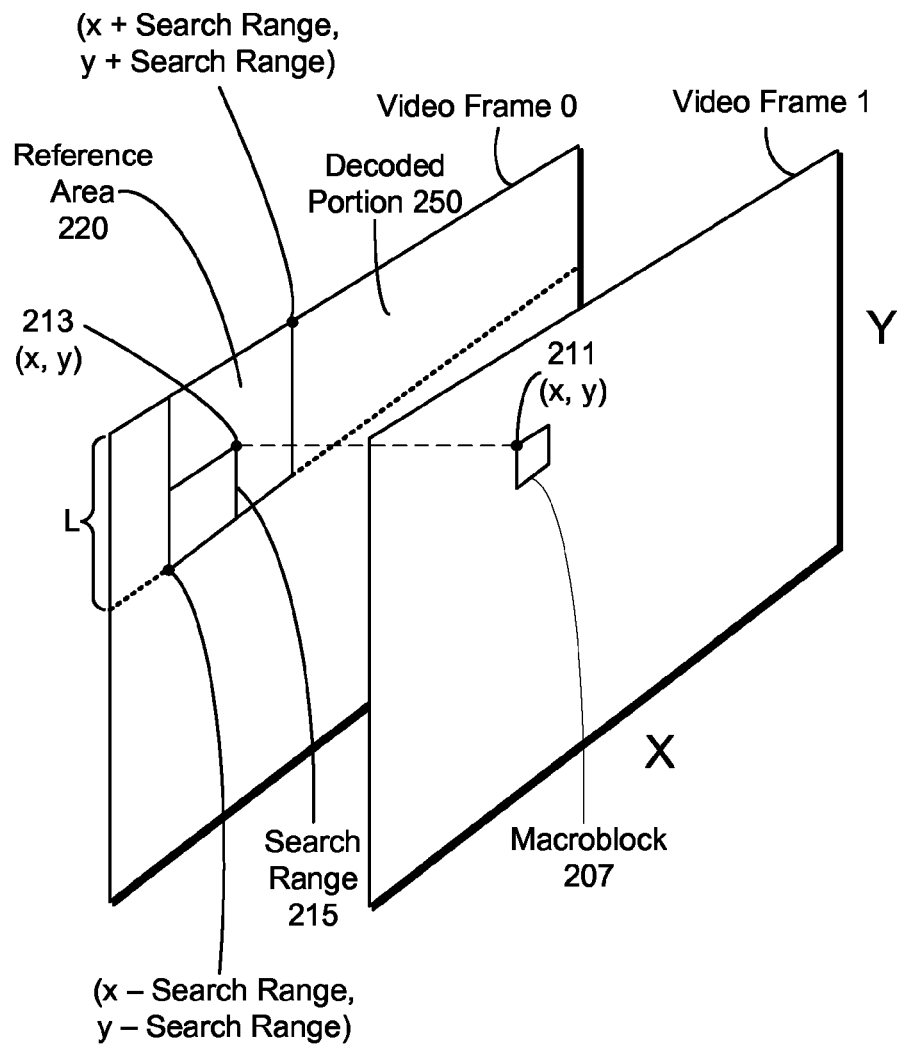

FIG. 2A is similar to the diagram illustrated in FIG. 2. However, in FIG. 2A, a different macroblock 207 located at a different place within the video frame 1 is now being decoded. The macroblock 207 has a start location of (x, y) at point 211 of the video frame 1 currently being decoded. Just as with macroblock 205, the start location (x, y) at point 211 need not be in the upper-left corner, but can be at any predefined point associated with the macroblock 207.

The decoding of macroblock 207 can use information, such as previously decoded pixels or fractions of pixels in a previously decoded portion of frame 0, that are located in a reference area 220 bounded by the rectangle starting at location (x− search range, y− search range) and ending at location (x+ search range, y+ search range), where x corresponds to an x-coordinate of point 213 and y corresponds to a y-coordinate of point 213. Point 213 of previous video frame 0 corresponds to a similarly located point 211 of current video frame 1.

The decoder 130 can process any macroblock within video frame 1 so long that it has a previously decoded reference area 220 in video frame 0 to which it can make reference. At times, the reference area 220 may extend beyond the boundaries of the video frame 0. For example, the coordinates (x− Search Range, y− Search Range) of the reference area 220 may in some cases fall outside the left most edge of the video frame 0 itself (not shown). In such scenarios, the decoder 130 can nevertheless decode a macroblock near the left edge of video frame 1, and still make reference to at least the portion of the reference area 220 that falls within the boundaries of the video frame 0.

Thus, the decoder 130 can begin decoding macroblock 205 (of FIG. 2) or macroblock 207 (of FIG. 2A), or other similarly situated macroblocks, as long as the decoder 125 is L number of lines ahead of the decoder 130 in their decoding. Indeed, any macroblock of video frame 1 can be decoded by decoder 130 if it has a corresponding previously decoded reference area of video 0 to which it can make reference.

Figure 3:
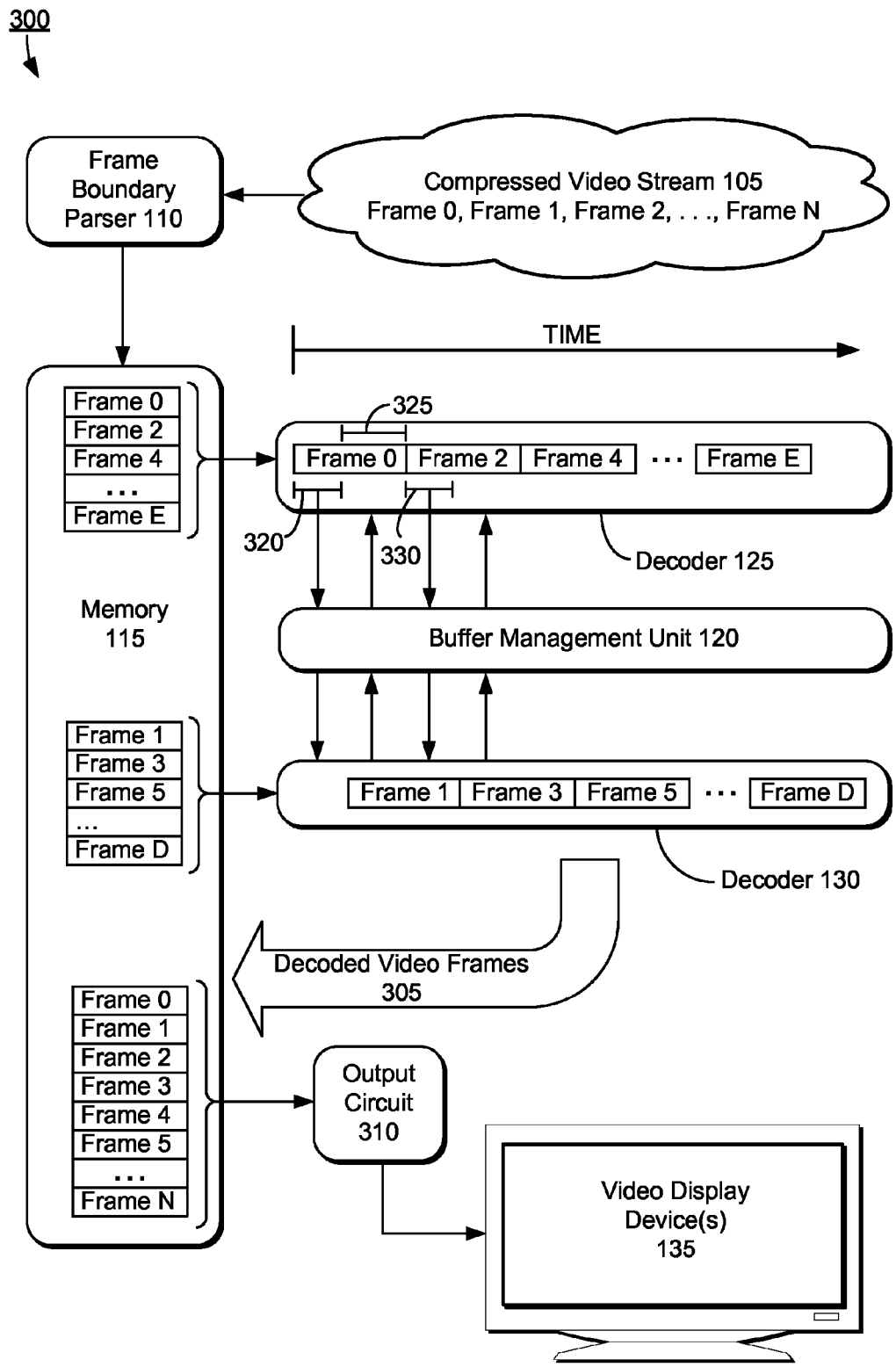
FIG. 3 is a block diagram showing more detailed aspects of the staggered parallelized video decoding system of FIG. 1.

FIG. 3 is a block diagram 300 showing more detailed aspects of the staggered parallelized video decoding system 100 of FIG. 1. The frame boundary parser 110 receives the compressed video stream 105 and can identify even video frames and odd video frames from the video stream. The frame boundary parser 110 can parse the start codes of the video frames to identify the various even and odd frames. The compressed even and odd video frames are stored in the hardware memory 115, for example, by the frame boundary parser 110. For example, video frames 0, 2, 4, etc., through video frame E can be contiguously stored in one location of the memory 115, and video frames 1, 3, 5, etc., through video frame D can be stored contiguously in another location of the memory 115. Alternatively, the compressed video frames can be stored in any arrangement in memory 115, or in separate memories (not shown).

The first decoder 125 reads and processes a portion 320 of a first compressed even frame 0 from among the even frames stored in memory 115. After the decoder 125 completes processing the portion 320 of the first even frame 0, the second decoder 130 can begin reading and processing a first compressed odd frame, such as frame 1, from among the stored odd frames. As a result, the start times for the decoders 125 and 130 are staggered, by the length of time measured by processing the portion 320, and each of the decoders 125 and 130 simultaneously decode different portions of the compressed video stream 105, while optionally relying on previously decoded portions. The portion 320 can correspond to the decoded portion 250 illustrated in FIGS. 2 and 2A.

To further illustrate, assume that the portion 320 of video frame 0 is processed by the decoder 125 before the decoder 130 begins processing the odd frames. The decoder 125 stores information derived from the decoding of the portion 320, or the decoded portion 320 itself, in the buffer management unit 120. The second decoder 130 reads at least some of the information stored in the buffer management unit 120 about the decoded portion 320 of the video frame 0 after the first decoder 125 completes processing the portion 320, during the processing of a first odd video frame 1 from among the stored odd frames. In other words, in some embodiments, the second decoder 130 begins processing the first odd frame 1 after the first decoder 125 completes processing the portion 320, but before the first decoder 125 completes processing a remaining portion 325 of the first even frame 0. The second decoder 130 simultaneously decodes portions of the first odd frame 1 in parallel with the decoder 125 decoding the remaining portion 325 of the first even frame 0. As shown in FIG. 3, the remaining portion 325 is different from the portion 320.

It should be understood that the decoder 125 can store information derived from the decoding of the remaining portion 325, or the decoded remaining portion 325 itself, in the buffer management unit 120. Similarly, the decoder 130 can store information derived from the decoding of the video frame 1, or the decoded video frame 1 itself, in the buffer management unit 120. The timing of storing such information in the buffer management unit 120 need not correspond exactly with the arrows as illustrated pointing toward the buffer management unit 120 of FIG. 3, as these are for illustrative purposes, and may be shifted to the left or to the right and still remain within the inventive principles disclosed herein.

After the decoder 125 completes decoding the remaining portion 325 of the first even frame 0, the decoder 125 can begin decoding a portion 330 of the next even frame 2 from among the even frames stored in memory 115. After the first decoder 125 completes processing the portion 330 of the even frame 2, the second decoder 130 begins processing a next odd frame 3 from among the odd frames stored in memory 115. In this manner, a processing time of the odd frames is staggered with respect to the even frames. As a result, the first decoder 125 and second decoder 130 process at least some of the even frames and the odd frames simultaneously, or otherwise in parallel. In a preferred embodiment, the sizes of the portions 320 and 330 are the same, as well as subsequent similarly situated portions within the video frames.

Once the decoding of the odd video frames, such as video frames 1 and 3, has started, the decoding of the even and odd video frames, such as video frames 0, 1, 2, and 3 etc., can run at "full throttle," or in other words, as fast as each decoder can process video frames, without the need for any decoder to wait for another decoder to finish decoding a remaining region, for the remainder of the video stream 105—because once the first decoder 125 is L lines ahead of the second decoder 130, it will continue to remain ahead.

In an alternative embodiment, one decoder might be faster than another decoder. For example, if the first decoder 125 processes video frames faster than the second decoder 130, then the first decoder 125 will periodically wait for the second decoder 130 to "catch up." In other words, the first decoder 125 can pause for a certain amount of time after processing the portion 320 or 325. The time that the first decoder 125 pauses is based on the difference in processing speed between the two decoders. The reverse can also be true. For example, if the second decoder 130 processes video frames faster than the first decoder 125, then the second decoder 130 will periodically wait for the first decoder 125 to catch up.

In some sense, odd frame 1 is related to even frame 0, because the decoding of odd frame 1 can depend on the decoding of at least a portion of even frame 0. Similarly, odd frame 3 is related to even frame 2, because the decoding of odd frame 3 can depend on the decoding of at least a portion of even frame 2. In a broader sense, any of the odd frames may be related to any of the even frames, or vice versa, because the decoding of any frame can depend on the decoding of at least a portion of any of the previous frames, odd or even. While the example embodiments disclosed herein contemplate starting the decoding of the odd frames after starting the decoding of the even frames, the disclosure is not limited thereto, and the reverse can also be implemented.

In the illustrated embodiments, the decoding of the even video frames is ahead in time of the decoding of the odd video frames by a processing time that is determined based on at least the number of lines L, thus ensuring that the motion compensation process has the information needed from the respective previous frames. In other words, the first decoder 125 is configured to begin processing the even frames at a first time, and the second decoder 130 is configured to begin processing the odd frames at a second time, where the second time is later than the first time by an amount of time associated with a number of lines L of the reference area, e.g., the reference area 220 of FIG. 2. The video decoding performance can therefore be approximately doubled by adding a latency to the processing of the odd frames, thereby staggering the processing, and parallelizing the decoding of the even and odd frames regardless of the actual latency time between the starting times of the decoders, provided that the latency time between the starting times of the decoders is equal to one half or less of the overall processing time of a single video frame. Also, although described here as "even" and "odd" frames, concepts of the invention apply no matter whether even or odd frames are decoded first. By using two decoders, even and odd video decoding performance is approximately doubled.

As each video frame is decoded, or after the video frames are decoded, the decompressed frames are written into the memory 115, for example, by the decoders 125 and 130. Thereafter, the decompressed video frames 0, 1, 2, etc., through N, are optionally read from the memory 115 by output circuit 310, or otherwise transmitted to the output circuit 310, and eventually transmitted to one or more video display devices 135.

Figure 4:
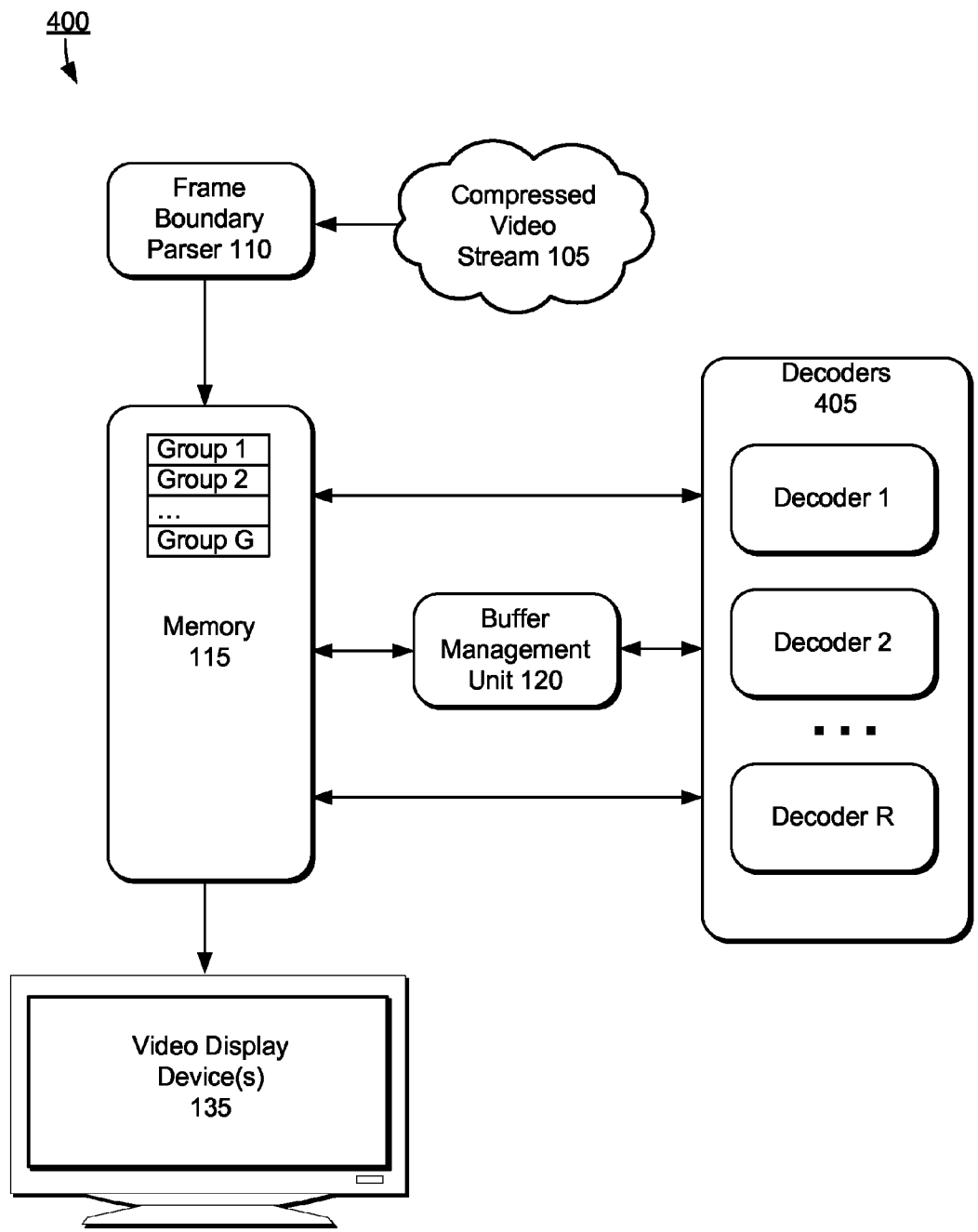
FIG. 4 is a block diagram showing another example embodiment of the inventive staggered parallelized video decoding system.

FIG. 4 is a block diagram 400 showing another inventive staggered parallelized video decoding system. Many of the details of the compressed video stream 105, the frame boundary parser 110, the memory 115, the buffer management unit 120, and the video display devices 135 are discussed above, and for the sake of brevity, are not repeated.

The decoders 405 may include multiple decoders, for example, decoder 1, decoder 2, etc., through decoder R. The maximum number of decoders R can be determined as follows. First, a frame height H of at least one of the even or odd frames is determined. The frame height H is divided by a number of lines L associated with a reference area, such as reference area 220 of FIG. 2 to arrive at a number Z. As previously discussed, the reference area 220 may be determined using, for example, a search range 215, and/or a number of lines associated with the search range 215 of FIG. 2. The number Z is then rounded down to a nearest whole number R, and R or fewer decoders are configured to process at least some of the even and odd frames, or other grouped video frames, simultaneously.

If more than two decoders are used, then the video frames are not grouped by even and odd frames. Rather, the frame boundary parser 110 can determine G groups of video frames and can associate each group with a corresponding one of the R or fewer decoders. Consider the following example groupings:

Decoder 1: Group 1: video frames 0, R, 2R, 3R, . . . .

Decoder 2: Group 2: video frames 1, R+1, 2R+1, 3R+1, . . . .

Decoder 3: Group 3: video frames 2, R+2, 2R+2, 3R+2, . . . .

. . . .

Decoder R: Group G: video frames R−1, 2R−1, 3R−1, . . . .

While the above groupings are one way to form groups of video frames, it should be understood that other groupings are possible without deviating from the spirit and scope of the various embodiments of the invention.

A beginning processing time of each of the R or fewer decoders can be staggered so that the video frames are simultaneously decoded using the R or fewer decoders. The frame boundary parser 110 can receive the compressed video stream 105 and identify groups of video frames from the video stream, such as groups 1, 2, etc., through G. The groups of video frames are stored in the memory 115. The frame boundary parser 110 can identify the groups of video frames based at least on the start codes embedded in one or more of the video frames.

Each of the video decoders, such as video decoders 1, 2, etc., through R, are structured to process video frames from a corresponding one group of video frames. While the number of decoders R is preferably equal to the number of groups G, this need not be true; R can be greater than or less than G. The video decoders are structured to simultaneously decode at least one video frame from each group. For example, video decoder 1 can decode a video frame from group 1 at the same time as video decoder 2 is decoding a video frame from group 2, each of which occurs at the same time video decoder R is decoding a video frame from group G, and so forth.

At least some of the video decoders 1, 2, etc., through R, are configured to read at least some of the information stored in the buffer management unit 120 about video frames decoded by a different video decoder from among the video decoders 1, 2, etc., through R. Once the video frame or frames is decoded, the decoded video frames can be transmitted back to the memory 115, and eventually to one or more video display devices 135, similar to that previously discussed.

Figure 5:
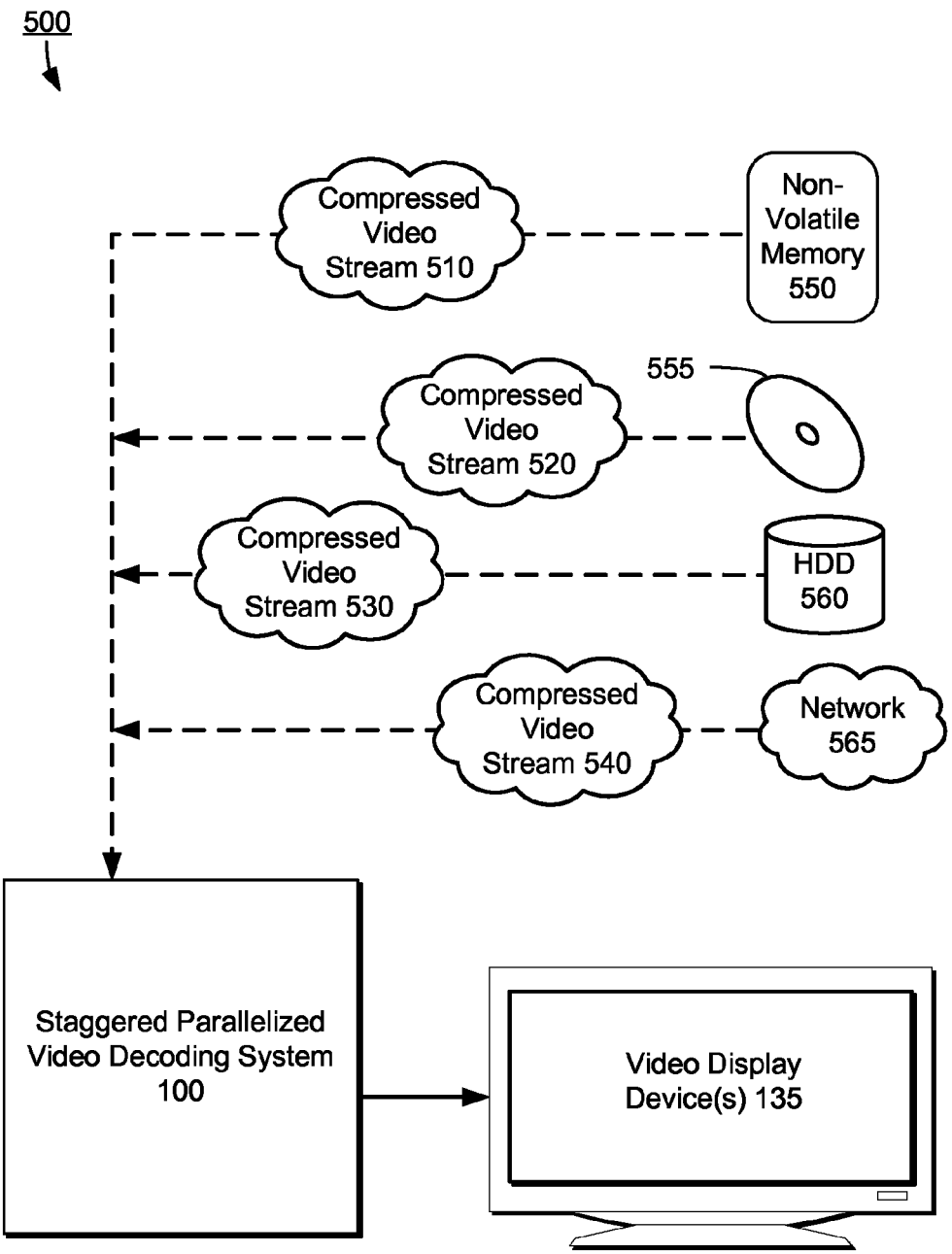
FIG. 5 is a block diagram showing compressed video streams originating from various storage mediums or a network, and decoded by an embodiment of the inventive staggered parallelized video decoding system.

FIG. 5 is a block diagram 500 showing compressed video streams such as 510, 520, 530, and 540 originating from various storage mediums such as non-volatile memory 550 including a flash memory chip or card, an optical disk 555 such as a DVD disc, a hard disk drive (HDD) 560, or a network 465 such as the Internet, a digital subscriber line (DSL), a wireless network, or a satellite system, among other possibilities. The video streams may be decoded by one or more embodiments of the staggered parallelized video decoding system 100. The staggered parallelized decoding system 100 may be operatively coupled to one or more of the storage mediums, and may receive one or more of the video streams for decoding, and transmitted for display on one or more video display devices 135.

Figure 6A:
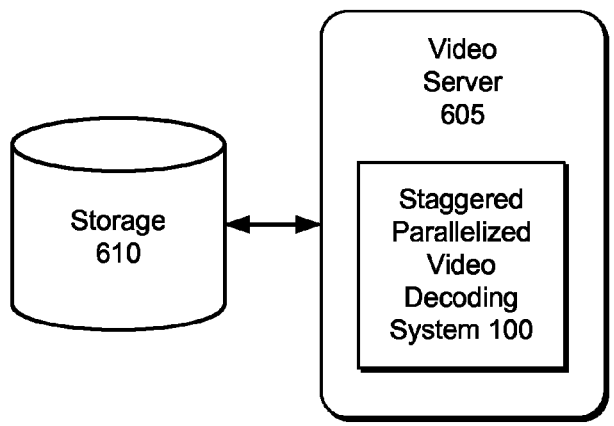
FIGS. 6A-6D show various video storage and display devices in which the inventive staggered parallelized video decoding system can be embodied.

FIGS. 6A-6D show various video storage and display devices in which the staggered parallelized video decoding system can be embodied. For example, FIG. 6A shows a high-performance video server 605, which is generally coupled to high performance storage 610, and can include the staggered parallelized video decoding system 100 to achieve higher video decoding performance. Such high-performance video servers are often used by television broadcasters, cable television companies, satellite companies, special or live event coordinators, or the like.

Figure 6B:
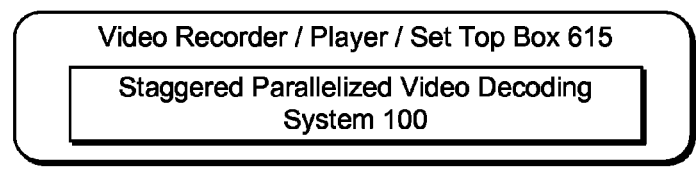

FIG. 6B shows a video recorder/player/set top box 615, which can include the staggered parallelized video decoding system 100 to achieve higher video decoding performance. While it is referred to as the video recorder/player/set top box, device 615 can include any of those functions, or similar functions. Such a device is often found in homes, schools, or businesses, and are typically attached to a satellite, a cable television connection, or a computer. The device 615 can be implemented as, for example, a high resolution video player, a personal video recorder (PVR), a digital video recorder (DVR), among other possibilities.

Figure 6C:
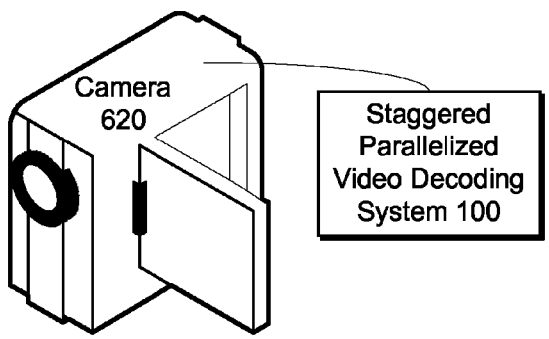
Figure 6D:
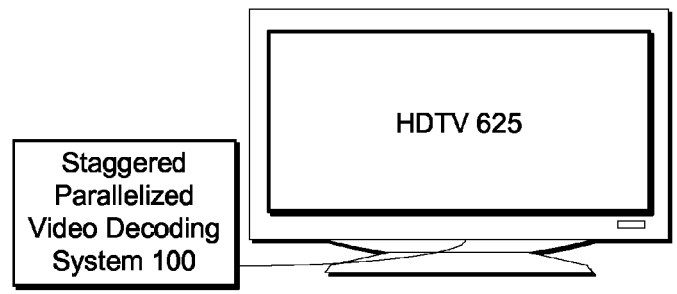

FIG. 6C shows a camera 620, which can include a regular video camera, high performance video or movie camera, or a still shot camera that has the capability of displaying video streams, which also includes an embodiment of the staggered parallelized video decoding system 100 described above for use in the camera 620 to playback previously stored videos. FIG. 6D shows a high definition television (HDTV) 625 including the staggered parallelized video decoding system 100. Device 625 can also include an internet protocol television (IPTV), or a regular non-HDTV, among other possibilities. The staggered parallelized video decoding system 100 can be included in any device where video playback is needed.

Figure 7:
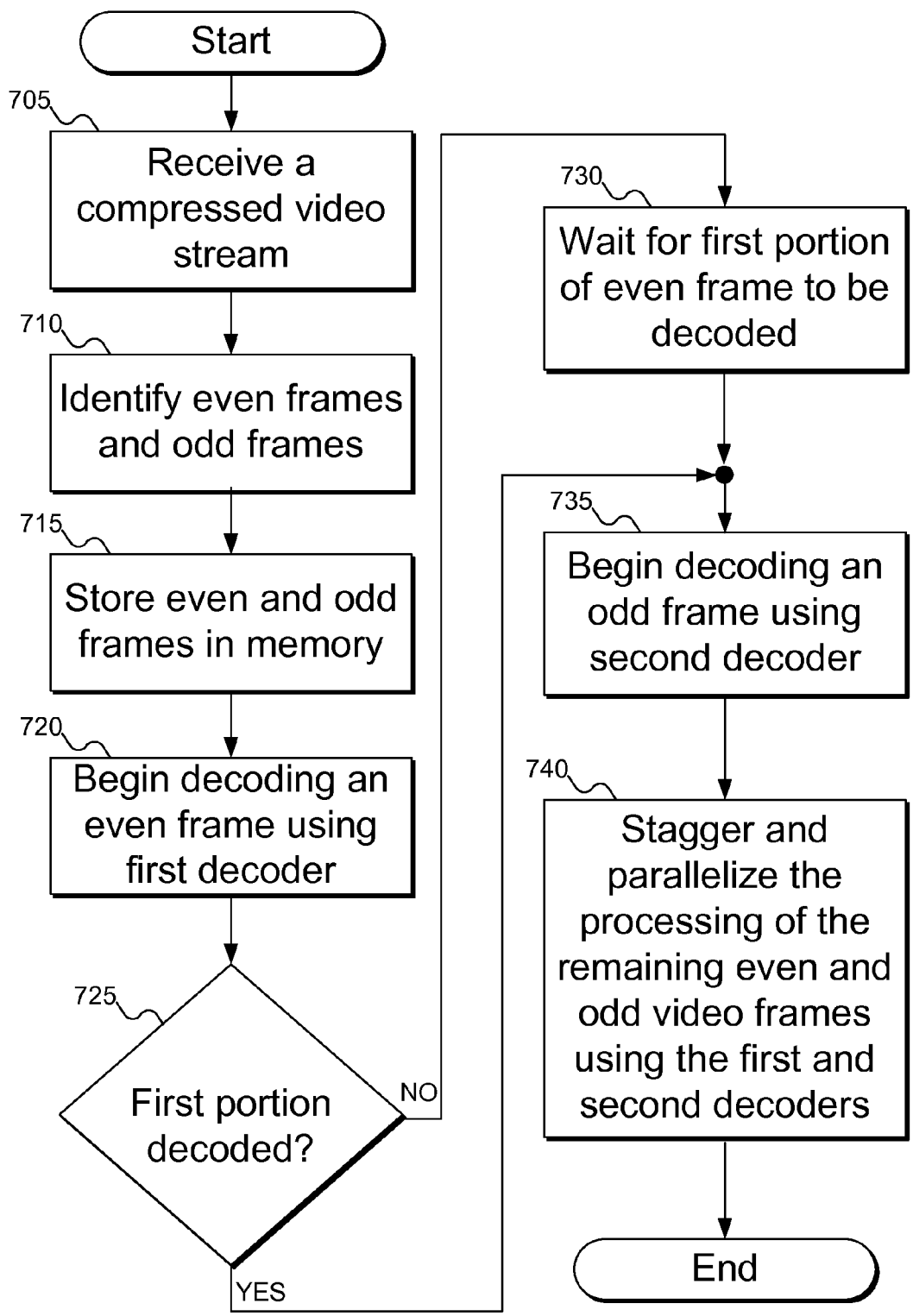
FIG. 7 is a flow diagram illustrating an example process for staggering and parallelizing the processing of even and odd video frames using first and second decoders, according to embodiments of the invention.

FIG. 7 is a flow diagram illustrating an example process for staggering and parallelizing the processing of even and odd video frames using first and second decoders, according to embodiments of the invention. At 705, a compressed video stream is received by a frame boundary parser, such as frame boundary parser 110 of FIG. 1. The frame boundary parser identifies even and odd video frames at 710. The even and odd video frames are stored in a memory at 715. At 720, a first decoder, such as decoder 125 of FIG. 1, begins decoding a first even frame. A determination is made at 725 whether a first portion of the first even frame has finished decoding. If yes, the flow proceeds to 735. If no, a second decoder, such as decoder 130 of FIG. 1, waits for the first portion of the first even frame to be decoded at 730, and then proceeds to 735, where the second decoder begins decoding a first odd frame. The first portion may relate to an area of or number of lines of the first even frame.

In other words, after the first portion of the first even frame has been decoded, the second decoder begins decoding a first odd frame simultaneous with the first decoder decoding the remaining portion of the first even frame. At 740, the remaining even and odd video frames of the video stream are processed in a staggered and parallelized manner using the first and second decoders. The video decoding performance can therefore be approximately doubled.

From the foregoing it will be appreciated that, although specific embodiments of the invention have been described herein for purposes of illustration, various modifications may be made without deviating from the spirit and scope of the invention.

For example, although the embodiments described above include achieving video decoder performance gains by staggering and parallelizing the processing of the video frames, further performance enhancements can be made by increasing the operating frequency of both of the decoders in the case of two decoders, or of all of the decoders in the case of more than two decoders.

The staggered parallelized video decoding system can process and decode video streams from any encoder. The encoder need not understand or know about the particulars of the staggered parallelized video decoding system. In other words, the staggered parallelized video decoding system is backwards compatible with previous, current, or future video encoders.

Moreover, the inventive aspects as disclosed herein can also be combined with the approach of increasing the throughput of each decoder by decreasing the target number of clocks per macroblock. This results in more video macroblocks being processed per second by both decoders in the case of two decoders, or by all of the decoders in the case of more than two decoders.

The following discussion is intended to provide a brief, general description of a suitable machine or machines in which certain aspects of the invention can be implemented. Typically, the machine or machines include a system bus to which is attached processors, memory, e.g., random access memory (RAM), read-only memory (ROM), or other state preserving medium, storage devices, a video interface, and input/output interface ports. The machine or machines can be controlled, at least in part, by input from conventional input devices, such as keyboards, mice, etc., as well as by directives received from another machine, interaction with a virtual reality (VR) environment, biometric feedback, or other input signal. As used herein, the term "machine" is intended to broadly encompass a single machine, a virtual machine, or a system of communicatively coupled machines, virtual machines, or devices operating together. Exemplary machines include computing devices such as personal computers, workstations, servers, portable computers, handheld devices, telephones, tablets, etc., as well as transportation devices, such as private or public transportation, e.g., automobiles, trains, cabs, etc.

The machine or machines can include embedded controllers, such as programmable or non-programmable logic devices or arrays, Application Specific Integrated Circuits (ASICs), embedded computers, smart cards, and the like. The machine or machines can utilize one or more connections to one or more remote machines, such as through a network interface, modem, or other communicative coupling. Machines can be interconnected by way of a physical and/or logical network, such as an intranet, the Internet, local area networks, wide area networks, etc. One skilled in the art will appreciated that network communication can utilize various wired and/or wireless short range or long range carriers and protocols, including radio frequency (RF), satellite, microwave, Institute of Electrical and Electronics Engineers (IEEE) 545.11, Bluetooth, optical, infrared, cable, laser, etc.

Embodiments of the invention can be described by reference to or in conjunction with associated data including functions, procedures, data structures, application programs, etc. which when accessed by a machine results in the machine performing tasks or defining abstract data types or low-level hardware contexts. Associated data can be stored in, for example, the volatile and/or non-volatile memory, e.g., RAM, ROM, etc., or in other storage devices and their associated storage media, including hard-drives, floppy-disks, optical storage, tapes, flash memory, memory sticks, digital video disks, biological storage, etc. Associated data can be delivered over transmission environments, including the physical and/or logical network, in the form of packets, serial data, parallel data, propagated signals, etc., and can be used in a compressed or encrypted format. Associated data can be used in a distributed environment, and stored locally and/or remotely for machine access.

Other similar or non-similar modifications can be made without deviating from the intended scope of the invention. Accordingly, the invention is not limited except as by the appended claims.

What is claimed is:

1. A system, comprising:
a frame boundary parser to receive a compressed video stream and to identify even frames and odd frames from the video stream;
a memory to store the even and odd frames;
a first decoder operatively coupled to the memory and structured to process first and second portions of each of the stored even frames, the first portion corresponding to an L number of lines of an even frame, wherein the L number of lines corresponds to a height of a reference area of the even frame; and
a second decoder operatively coupled to the memory and structured to process each of the stored odd frames after the first decoder processes a corresponding first portion of a related even frame from among the stored even frames.

2. The system of claim 1, wherein:
the first decoder is structured to process the first portion of a first even frame from among the stored even frames; and
the second decoder is structured to begin processing a first odd frame, which is related to the first even frame, responsive to the first decoder completing processing the first portion of the first even frame, and substantially simultaneously with the first decoder processing the second portion of the first even frame.

3. The system of claim 2, wherein:
the first decoder is structured to process the first portion of a second even frame from among the stored even frames; and
the second decoder is structured to begin processing a second odd frame, which is related to the second even frame, responsive to the first decoder completing processing the first portion of the second even frame, and substantially simultaneously with the first decoder processing the second portion of the second even frame.

4. The system of claim 1, wherein the first and second decoders are configured to simultaneously decode even and odd frames, respectively.

5. A system, comprising:
a frame boundary parser to receive a compressed video stream and to identify first and second groups of video frames from the video stream;
a first decoder configured to begin processing video frames from the first group at a first time;
a second decoder configured to begin processing video frames from the second group at a second time,
wherein the second time is later than the first time by a predefined amount of time, the predetermined amount of time is based on an L number of lines of an even frame, wherein the L number of lines corresponds to a height of a reference area of the even frame.

6. The system of claim 5, further comprising:
a memory to store the video frames, wherein:
the first decoder is operatively coupled to the memory and structured to process a first portion of each of the stored video frames from the first group;
the second decoder is operatively coupled to the memory and structured to process each of the stored video frames from the second group after the first decoder processes the corresponding first portion of a related video frame from among the stored video frames of the first group.

7. The system of claim 5, wherein the predefined amount of time is associated with a number of lines of a search range.

8. The system of claim 5, wherein the frame boundary parser is configured to identify three or more groups of video frames from the video stream, the system further comprising:
   three or more video decoders, each decoder structured to process video frames from a corresponding one group of video frames, wherein the beginning processing times for each decoder is staggered.

* * * * *